(No Model.)  3 Sheets—Sheet 1.

J. C. BAYLES.
MEANS FOR ATTACHING COUPLING CASTINGS TO SHEET METAL PIPE.

No. 455,502.  Patented July 7, 1891.

Attest:
L. Lee.
F. C. Fischer.

Inventor.
James C. Bayles,
per Crane & Miller, Attys.

(No Model.)  3 Sheets—Sheet 2.

J. C. BAYLES.
MEANS FOR ATTACHING COUPLING CASTINGS TO SHEET METAL PIPE.

No. 455,502. Patented July 7, 1891.

Attest:
L. Lee.
F. C. Fischer.

Inventor.
James C. Bayles,
per Crane & Miller, Attys.

(No Model.) 3 Sheets—Sheet 3.

J. C. BAYLES.
MEANS FOR ATTACHING COUPLING CASTINGS TO SHEET METAL PIPE.

No. 455,502. Patented July 7, 1891.

Attest:
L. Lee.
F. C. Fischer.

Inventor.
James C. Bayles,
per Crane & Miller, Attys.

UNITED STATES PATENT OFFICE.

JAMES C. BAYLES, OF EAST ORANGE, NEW JERSEY.

MEANS FOR ATTACHING COUPLING-CASTINGS TO SHEET-METAL PIPE.

SPECIFICATION forming part of Letters Patent No. 455,502, dated July 7, 1891.

Application filed September 22, 1890. Serial No. 365,864. (No model.)

*To all whom it may concern:*

Be it known that I, JAMES C. BAYLES, a citizen of the United States, residing at East Orange, Essex county, New Jersey, have invented certain new and useful Improvements in Means for Attaching Coupling-Castings to Sheet-Metal Pipe, fully described and represented in the following specification and the accompanying drawings, forming a part of the same.

The object of this invention is to furnish an effective and inexpensive means for connecting sheet-metal pipes together, or to pipes of other classes already in use for conducting steam, water, and various fluids.

By this invention sheet-metal pipes may be cheaply united and may be readily inserted in connection with systems of cast and wrought pipe already in use.

The invention will be understood by reference to the annexed drawings, in which—

Figure 1:
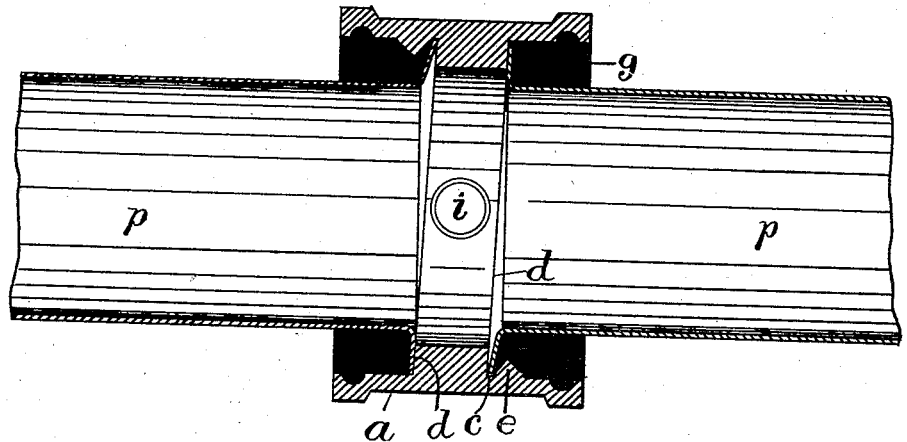
Figure 2:
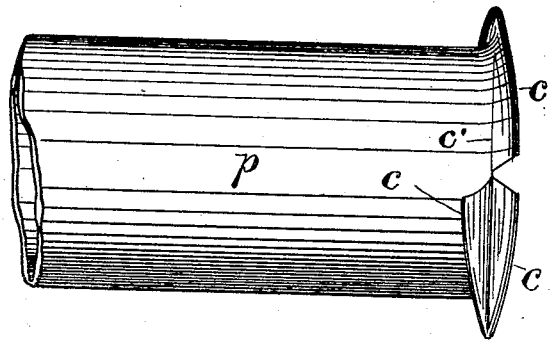
Figure 4:
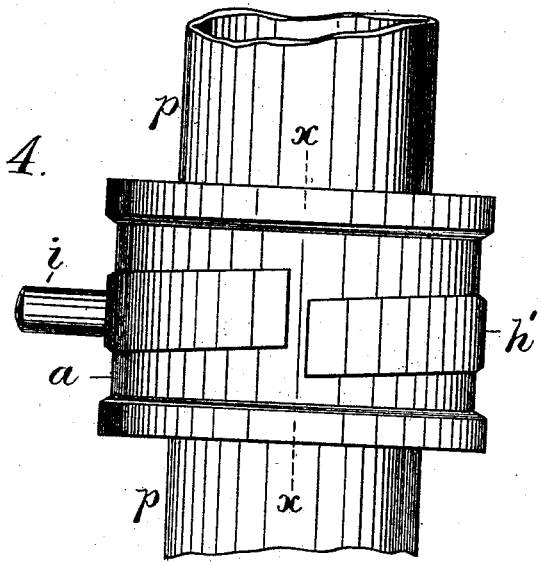
Figure 5:
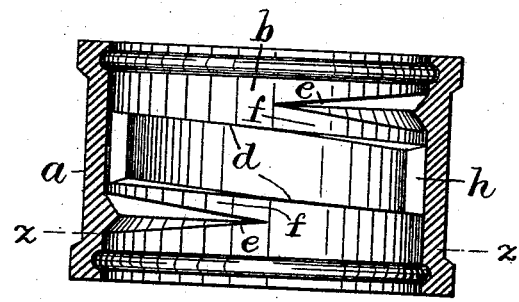
Figure 6:
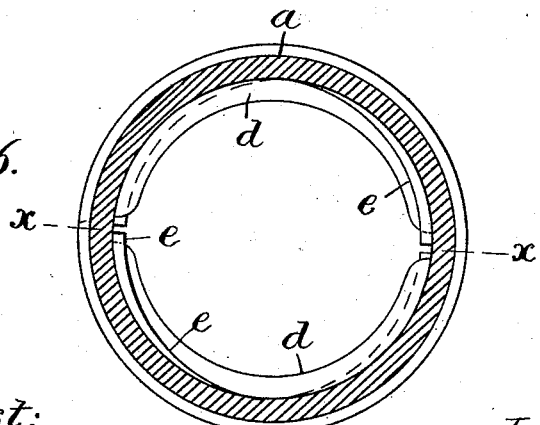
Figure 7:
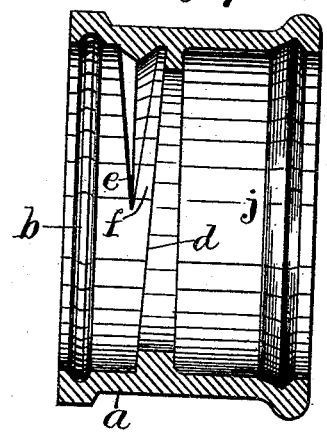
Figure 8:
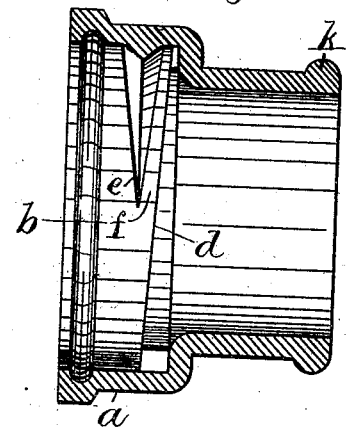
Figure 9:
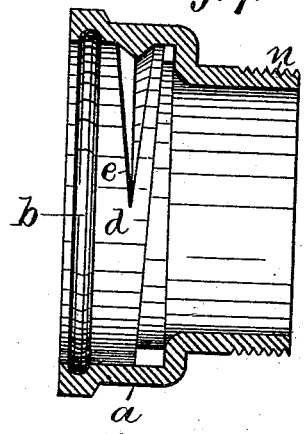
Figure 10:
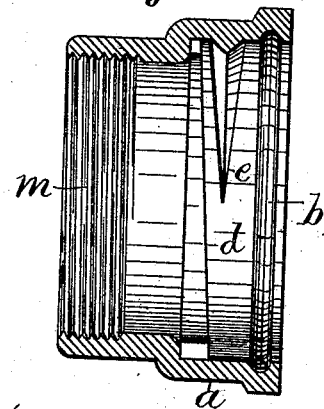
Figure 11:
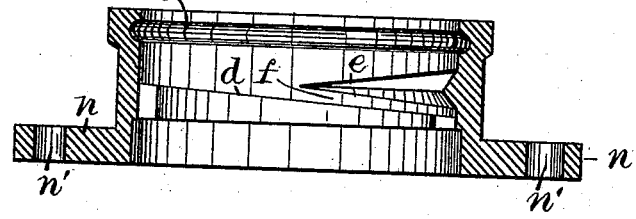

Figure 1 is a section of two pipe ends and a coupling-sleeve. Fig. 2 is a side view, and Fig. 3 an end view, of the flanged-pipe end. Fig. 4 is an external view of the coupling-sleeve shown upon the pipe ends in Fig. 1. Fig. 5 is a section of the coupling-sleeve on line $x$ $x$ in Figs. 4 and 6, and Fig. 6 is a section on line $z$ $z$ in Fig. 5. Fig. 7 represents my coupling-sleeve constructed upon a hub adapted for operation with standard cast-iron mains. Fig. 8 represents the sleeve constructed upon a spigot for co-operation with a hub. Fig. 9 represents the sleeve constructed with a threaded nozzle to connect with thread-pipe couplings. Fig. 10 represents the sleeve constructed with a threaded socket to unite with ordinary threaded pipe, and Fig. 11 represents the sleeve constructed with a bolting-flange adapted for union with flanged pipes.

Figure 3:
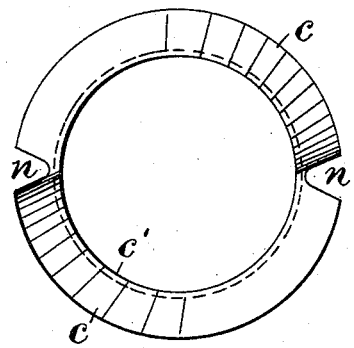

The pipe $p$, required for use with my couplings and shown in Figs. 2 and 3, is provided with segmental spiral wings or flanges $c$ by forming a single circular flange upon the end of the pipe, cutting two or more notches $n$ into such flange to the body of the pipe, and then bending or twisting the segmental wings or portions between the notches into a spiral form. The pipe with such flanges is made the subject of a separate application, Serial No. 350,123, filed May 1, 1890. The coupling-sleeve $a$ is formed with a socket $b$ of suitable dimensions to admit the spiral wings, and is provided internally with a series of spiral bearing-seats $d$, fitted each to the outer or front face of one of the wings, as shown in Fig. 1. A series of guide-lugs $e$, corresponding in number with the seats, are formed within the socket at an inclination to the faces of the spiral seats $d$ to form narrow spiral channels $f$, into which the wings are jammed by twisting the pipe or by turning the sleeve upon the end of the pipe. The guide-lugs bear upon the rear sides of the flanges $c$, and thus press their front sides against the seats $d$.

In Figs. 5 and 6 the seats $d$ are formed at opposite edges of semicircular segmental bands $h$, and in Fig. 4 two corresponding segmental spiral bands $h'$ are shown upon the exterior of the shell $a$ to indicate the location of the internal bands. By providing such external bands $h'$ a hole may be drilled from the outside of the shell for a service-pipe $i$, as shown at the left side of Fig. 4, without penetrating the pipes or their flanges.

The guide-lugs and seats operate to lock the wings upon the pipe ends within the sleeve apart from the packing which is used to form a tight joint. Such packing, as shown at $g$ in Fig. 1, is applied outside the wings between the body of the pipe and the shell, and may consist in fusible metal, Portland cement, asphaltum, or any other suitable material.

A mixture of Portland cement and sand is entirely suitable to form a water-tight joint between the pipe and the shell; but melted lead may be applied and calked in the usual manner employed in connecting hubs and spigots.

By the means described thin sheet-metal pipes may be provided upon their ends with socketed, threaded, or flanged connections, one end of the sleeve being constructed to fit the spiral wings and to receive a packing and the other end being shaped to form the desired connection. Thus in Fig. 7 the shell is shown formed at the right-hand end with a so-called "hub" $j$, adapted to fit over the end of a spigoted cast-iron pipe such as is commonly employed for gas and water mains. In Fig. 8 one end of the shell is shown provided with a spigot $k$, adapted for connection with the socket of similar cast pipes. In Fig. 9 one end of the sleeve is shown provided with an external thread $l$, adapting it to fit the couplings employed with wrought-iron threaded pipes. In Fig. 10 one end of the sleeve is provided with an internal thread $m$, adapted to fit directly upon the ends of threaded wrought-iron pipes. In Fig. 11 one end of the sleeve is provided with an external cast flange $n$, in which bolt-holes $o$ are indicated. Such flange for use with flanged cast-metal pipes would be circular and provided with the desired number of holes to bolt it to such flanged pipe. The socket $b$, formed in each of these sleeves and provided internally with the spiral bearing-seats $d$ and sloping lugs $e$, thus forms an economical and efficient means of uniting thin sheet-metal pipes to pipes of all other kinds, and thus facilitates the introduction of such thin sheet-metal pipes into the systems of gas and water pipe already in use. The market is thus greatly increased for spirally-welded sheet-metal pipes, which are much lighter for the same strength than any other class of pipes, but cannot be coupled therewith except special means be provided.

It is obvious that my invention is adapted for coupling a single pipe end to a T-elbow or any other fitting, provided the fitting be formed with a sleeve having the spiral bearing-seats $d$ and the guide-lugs $e$, corresponding in number with the segments of the flange upon the pipe which form the spiral wings $c$.

It will be readily understood that the contact of the spiral wings with the bearing-seats inside the sleeve does not form a joint to retain the contents of the pipe, but only locks the pipe end firmly within the sleeve and holds it independently of the packing which may be applied, while it also retains it centrally within the sleeve to admit of a uniform application of the packing around the pipe.

The construction necessarily involves the application of a tight packing in the ends of the sleeve adjacent to the pipe and its flange.

My invention is thus distinguished from any class of couplings in which spiral wings or ribs are used to form a water-tight joint.

Having thus set forth the nature of my invention, what I claim herein is—

1. The combination, with a pipe $p$, having the spiral segmental flanges $c$ formed upon its end, of the cast-metal sleeve $a$, provided internally with the spiral bearing-seats $d$, adapted to fit the front sides of the spiral flanges, and the sloping ribs $e$, adapted to fit the rear sides of the said flanges, the whole arranged and operated substantially as set forth.

2. The combination, with the pipe end $p$, having spiral segmental wings or flanges $c$ formed thereon, of the cast-metal sleeve $a$, provided internally with segmental bands having the spiral bearing-seats $d$ upon each of their opposite edges, the corresponding segmental bands $h'$ upon the exterior of the sleeve, and the inclined lugs $e$, adjacent to the bearing-seats $d$, the whole arranged and operated substantially as set forth.

3. The coupling-sleeve adapted for use with pipe ends having spiral segmental flanges, consisting in the cast-metal sleeve $a$, provided internally with the segmental spiral bands having the bearing-seats $d$ upon each of their opposite edges, corresponding segmental bands $h'$ upon the exterior of the coupling, and the sloping guide-lugs $e$, adjacent to the internal bands, as and for the purpose set forth.

In testimony whereof I have hereunto set my hand in the presence of two subscribing witnesses.

JAMES C. BAYLES.

Witnesses:
  HENRY PHILLIPS,
  HOWARD BAYLES.